(12) United States Patent
Yu et al.

(10) Patent No.: US 9,769,512 B2
(45) Date of Patent: Sep. 19, 2017

(54) SYSTEM AND METHOD FOR DELIVERING MEDIA BASED ON VIEWER BEHAVIOR

(71) Applicant: Time Warner Cable Enterprises LLC, New York, NY (US)

(72) Inventors: Jian Yu, Ashburn, VA (US); David Chen, Ashburn, VA (US); Vipul Patel, Great Falls, VA (US); Kenneth Gould, Reston, VA (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 160 days.

(21) Appl. No.: 13/671,956

(22) Filed: Nov. 8, 2012

(65) Prior Publication Data
US 2014/0130073 A1 May 8, 2014

(51) Int. Cl.
H04N 21/2668 (2011.01)
H04N 21/442 (2011.01)
H04N 21/24 (2011.01)

(52) U.S. Cl.
CPC ... *H04N 21/2668* (2013.01); *H04N 21/44218* (2013.01); *H04N 21/44222* (2013.01); *H04N 21/2402* (2013.01)

(58) Field of Classification Search
CPC ......... H04N 21/2668; H04N 21/44218; H04N 21/44222; H04N 21/2402; H04L 65/4092; H04L 65/604
USPC .......................................................... 725/14
See application file for complete search history.

(56) References Cited

U.S. PATENT DOCUMENTS

| 6,001,065 A | 12/1999 | DeVito |
| 6,904,408 B1 | 6/2005 | McCarthy et al. |
| 7,120,880 B1 | 10/2006 | Dryer et al. |
| 7,246,081 B2 | 7/2007 | Hill |
| 8,938,497 B1* | 1/2015 | Wang ............... H04N 21/43615 709/204 |
| 2004/0237097 A1* | 11/2004 | Covell ............. H04L 29/06027 725/16 |
| 2007/0056015 A1* | 3/2007 | Kortum et al. ............... 725/134 |
| 2008/0320545 A1* | 12/2008 | Schwartz ........... H04N 7/17318 725/135 |
| 2009/0195392 A1 | 8/2009 | Zalewski |

(Continued)

OTHER PUBLICATIONS

Audio and Video File Formats and File Sizes Author: Prof. Marc Johnson of Columbia University Date: Fall 2000.*

*Primary Examiner* — Nathan Flynn
*Assistant Examiner* — Tung T Trinh
(74) *Attorney, Agent, or Firm* — The Marbury Law Group, PLLC

(57) ABSTRACT

Methods, systems and devices are provided for communicating multimedia content over a service provider network. A network server may receive an audio-video stream from a content provider server, relaying the audio-video stream to a receiver device via the service provider network, receive an operating mode notification identifying a user behavior from the receiver device, and ceasing the relaying of the audio-video stream to the receiver device based on the user behavior. The network server may also alter the audio-video stream based on the received operating mode notification and send the altered audio-video stream to the receiver device via the service provider network.

25 Claims, 10 Drawing Sheets

(56) References Cited

U.S. PATENT DOCUMENTS

| | | | |
|---|---|---|---|
| 2009/0197524 A1* | 8/2009 | Haff | H04L 12/2827 455/3.06 |
| 2011/0131596 A1* | 6/2011 | Amsterdam et al. | 725/14 |
| 2011/0145708 A1* | 6/2011 | Bhogal | H04L 65/4092 715/716 |
| 2012/0072936 A1* | 3/2012 | Small | G06Q 30/00 725/10 |
| 2012/0144445 A1* | 6/2012 | Bonta | H04L 12/1868 725/116 |
| 2014/0020003 A1* | 1/2014 | Alshinnawi | H04N 21/236 725/12 |

\* cited by examiner

SYSTEM AND METHOD FOR DELIVERING MEDIA BASED ON VIEWER BEHAVIOR

BACKGROUND

Wired and wireless communication technologies have improved over the past several years, and service providers are now able offer their users a wide array of features and services over high capacity cable, fiber, and/or wireless networks. As a result, the popularity and usage of Internet protocol (IP) based services (e.g., streaming multimedia, IP television, games, etc.) has grown rapidly, and the improvements in network throughput afforded by the high capacity networks is being matched by the increase in user usage demands for IP services. By way of example, on-demand Internet streaming media services (e.g., Netflix®, Vudu®, Amazon®, etc.) can now account for forty percent of the total Internet traffic at peak hours. As these IP-based services continue to grow in popularity and usage, the efficient management of the amount of bandwidth consumed by streaming media services is of increasing economic importance.

SUMMARY

The various embodiments include methods of communicating multimedia content over a service provider network, which may include: receiving an audio-video stream from a content provider server, relaying the audio-video stream to a receiver device via the service provider network, receiving an operating mode notification from the receiver device, and ceasing the relaying of the audio-video stream based on a user behavior identified by the received operating mode notification. In an embodiment, the method may include altering the audio-video stream based on the received operating mode notification, and sending the altered audio-video stream to the receiver device via the service provider network. In a further embodiment, altering the audio-video stream based on the received operating mode notification may include generating an audio stream based on the audio-video stream.

In a further embodiment, the method may include detecting the user behavior in a device processor of the receiver device, selecting an operating mode in the device processor based on the detected user behavior, generating the operating mode notification in the device processor based on the selected operating mode, and sending the generated operating mode notification to the network server processor via the service provider network.

In a further embodiment, detecting the user behavior may include detecting that a user is not actively viewing content rendered on an electronic display of the receiver device. In a further embodiment, detecting that the user is not actively viewing content rendered on the electronic display of the receiver device may include activating a camera of the receiver device. In a further embodiment, detecting that the user is not actively viewing content rendered on the electronic display of the receiver device may include determining whether the user has scrolled off a video player portion of a web browser.

Further embodiments may include a computing device having a processor configured with processor-executable instructions to perform various operations corresponding to the methods discussed above.

Further embodiments may include a computing device having various means for performing functions corresponding to the various method operations discussed above.

Further embodiments may include a non-transitory processor-readable storage medium having stored thereon processor-executable instructions configured to cause a processor to perform various operations corresponding to the method operations discussed above.

Further embodiments may include a communication system that includes a server configured to transmit data via a service provider network and a receiver device configured to receive data via the service provider network. The server and receiver device may include processors configured with processor-executable instructions to perform various operations corresponding to the methods discussed above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
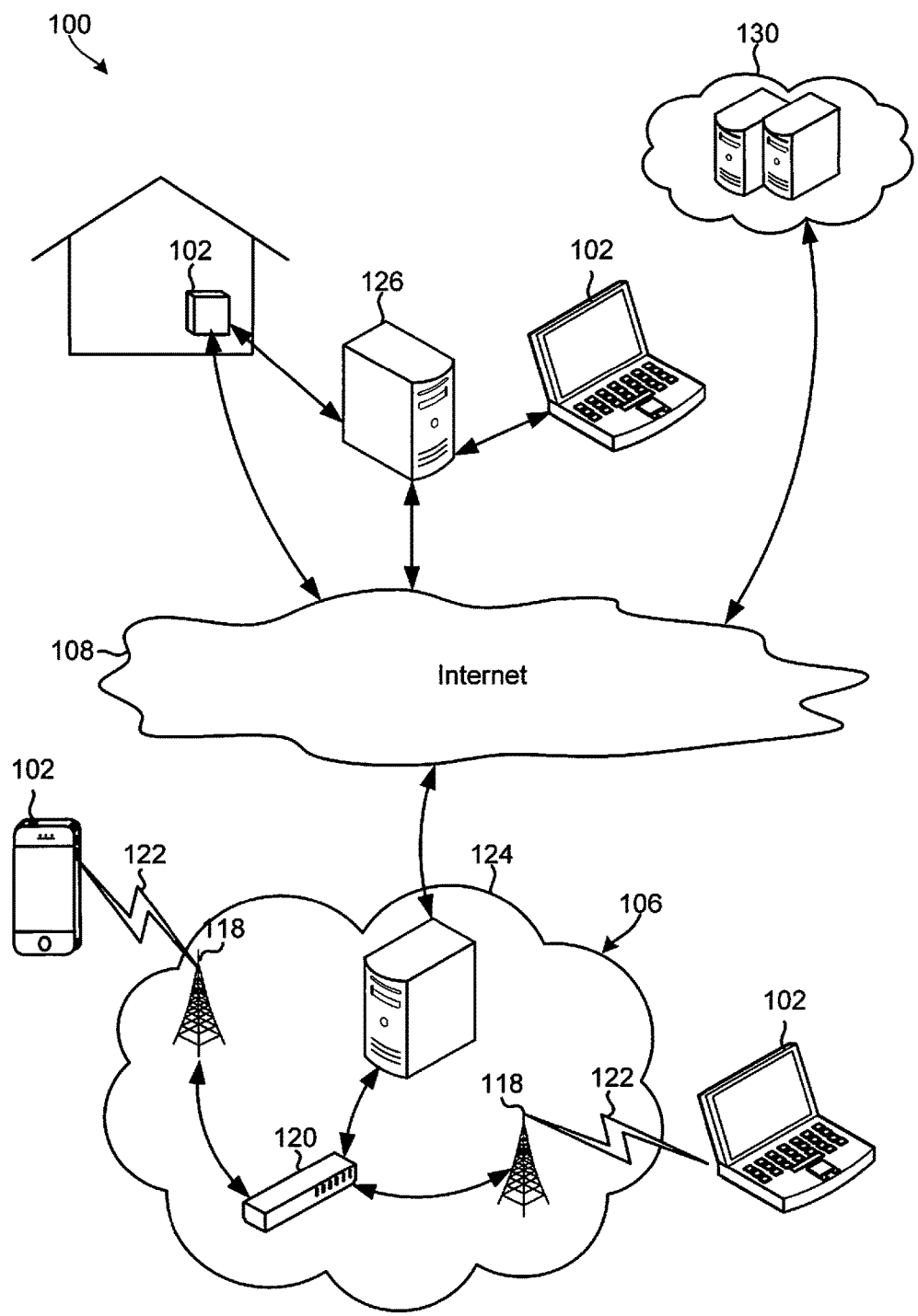
FIG. 1 is a communication system block diagram illustrating network components of a multimedia communication system suitable for use in various embodiments.

The various embodiments are described in detail with reference to the accompanying drawings. Wherever possible, the same reference numbers are used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "mobile device" is used herein to refer to any or all of smartphones, personal or mobile multi-media players, personal data assistants (PDA's), laptop computers, tablet computers, ultrabooks, media players, multimedia Internet enabled cellular telephones, wireless gaming controllers, and similar personal electronic devices which include a programmable processor and circuitry for receiving and processing multimedia information.

The term "receiver device" is used herein to refer to set-top-boxes, televisions, computing devices, mobile devices, and similar electronic devices that include circuitry for receiving multimedia information.

The term "service provider network" is used generically herein to refer to any network suitable for providing consumers with access to the Internet or IP services over broadband connections, and may encompass both wired and wireless networks/technologies. Examples of wired network technologies and networks that may be included within a service provider network include cable networks, fiber optic networks, hybrid-fiber-cable networks, networks that implement the data over cable service interface specification (DOCSIS), networks that utilize asymmetric digital subscriber line (ADSL) technologies, etc. Examples of wireless network technologies and networks that may be included within a service provider network include third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), high-speed downlink packet access (HSDPA), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), Bluetooth®, land mobile radio (LMR), and integrated digital enhanced network (iden). Each of these wired and wireless technologies involves, for example, the transmission and reception of data, signaling and/or content messages.

Any references to terminology and/or technical details related to an individual wired or wireless communications standard or technology are for illustrative purposes only, and not intended to limit the scope of the claims to a particular communication system or technology unless specifically recited in the claim language.

As mentioned above, IP and streaming multimedia services (e.g., Netflix®, Vudu®, Amazon®, YouTube®, etc.) are growing in popularity and use. For example, Netflix®, a subscription-based movie and television show rental service that streams video content over the Internet, currently has over twenty-six million subscribers and is one of the largest sources of web traffic in North America. Similarly, YouTube® (which is a video-sharing website that streams music videos, movies, TV shows, etc.) continues to grow in popularity and use, and now accounts for a significant portion of the total web traffic in North America. Due to the growth in popularity and usage of these and other IP and streaming media services, multimedia and video data now consume a significant portion of a service provider network's available resources (e.g., bandwidth, etc.).

To meet customer demands and manage increases in network traffic, service providers and multiple system operators (MSOs) are beginning to shift their subscription plans from a flat-rate unlimited usage model to an actual usage model in which subscribers are charged usage fees based on the amount of bandwidth and services they consume per billing period. In addition, many content providers and MSOs are changing their content delivery models from a more traditional video broadcast model to an IP-based video delivery model (e.g., unicast, etc.). Due to the large amount of information typically included in these video streams, video data is expected to become the primary source of web traffic and congestion in the future, and subscribers are expected to be charged substantial usage fees for viewing videos online.

The various embodiments provide systems, devices, and methods of efficiently communicating multimedia content (e.g., audio-video streams, etc.) over a service provider network to reduce the amount of network resources (e.g., bandwidth, etc.) consumed by IP and streaming multimedia services. Various embodiments enable a network server to selectively stream a subset of the content (e.g., multimedia data) received from a content sever to a receiver device (e.g., set-top-boxes, televisions, computing devices, mobile phones, etc.) based on detected user behavior and/or the availability of device or network resources. Various embodiments intelligently and dynamically adjust or elect media transport protocols based on the detected user behavior. Various embodiments reduce the amount of information communicated to a receiver device over the service provider network, thereby reducing web traffic, network congestion, and subscriber usage fees.

In addition to consuming network resources (e.g., bandwidth, etc.), video data may consume a significant portion of a receiver device's available processing and power resources. For example, displaying video content on a portable receiver device (e.g., smartphone, etc.) generally requires the execution of power and resource intensive software applications (e.g., media players) and/or multimedia processing tasks, which may greatly reduce the battery life and/or otherwise deplete the receiver device's resources. By way of example, a typical smartphone processor may consume 10-20 milliamps (mA) of current when idle, and around 400-600 mA of current when executing a multimedia task. This is due, in part, to the large amount of digital information that must be received, error-corrected, decoded, and processed by a receiver device in order to properly display the received video data.

The various embodiments reduce the amount of digital information received, error-corrected, decoded, and processed by a receiver device by enabling a receiver device to receive a subset of the content (e.g., multimedia data) streamed/downloaded from a content provider sever based on user behavior and/or the availability of device resources. Various embodiments also enable a receiver device to adjust its resource usage (e.g., turn off its display, enter a low power mode, cease video decoding operations, etc.) based on the received content and/or the detected user behavior or actions.

There are currently a number of readily available audio and video compression techniques (e.g., moving picture experts group "MPEG" compression, etc.) that reduce the spatial and temporal redundancy of the video to reduce the amount of information that is streamed/sent across the network. However, regardless of the efficiency of the compression methods, multimedia and video data still consume a significant amount of network resources (e.g., bandwidth, etc.) due to the enormous amount of encoded information that must be transmitted over the network. In addition, receiver devices may be required to perform complex and power intensive video processing and decoding operations to decode compressed video files into a format suitable for rendering the video content on an electronic display. These decoding operations may consume a significant amount of the receiver devices' power, processing, and memory resources. The various embodiments reduce the amount of information transmitted over the network, and eliminate or reduce the complexity of the processing operations performed by a receiver device in presenting content to users.

In addition to the compression techniques discussed above, existing solutions may employ adaptive bitrate streaming (ABS) techniques to reduce the amount of network resources consumed by video and multimedia data. These ABS technologies generally adjust the quality of a video stream so that the bitrate of the video stream is commensurate with the receiver device's capabilities. By way of example, dynamic adaptive streaming over HTTP (DASH) is an ABS technology that adjusts the quality of video streams based on the receiving device's available bandwidth and CPU capabilities. However, DASH and other ABS technologies only operate to reduce the quality of the audio-video content included in the stream received by the receiver device. For example, DASH and other ABS systems typically include a video encoder server that encodes a single raw audio-video file at multiple bit rates to generate the multiple versions of the same audio-video file. Each of the multiple versions of the audio-video file includes the same audio and video content, but at varying qualities (e.g., high definition, standard definition, 1080p, 720i, etc.). A video player client may request to receive one version of the multiple available versions based on the availability of resources. In this manner, the video player client may balance presentation quality against device resource availability by electing the most suitable video stream for reception. However, regardless of which stream the video player client elects to receive, the video player client always receives the same audio and video content.

As discussed above, existing ABS solutions simply adjust video quality by selecting one of a plurality of video streams based on the bandwidth and the CPU capabilities of the receiving device. In contrast, the various embodiments dynamically adjust the content of a multimedia or audio-video stream (i.e., as opposed to simply adjusting the bit-rate of the received stream) based on detected user behaviors or actions (i.e., as opposed to bandwidth or processing capabilities of a receiver device). For example, various embodiments may extract audio information from an existing audio-video stream and stream only the audio information to the receiver device based on determining that there is a high probability that the user is not actively viewing the video content and/or is only interested in listening to the audio content. As another example, various embodiments may terminate or delay the transmission of the entire audio-video stream based on determining that the user is not in close proximity to the receiver device.

The various embodiments may be implemented within a variety of multi-media delivery systems and/or communication networks, including broadcast networks, multicast networks, unicast networks, wired networks, wireless networks, cable television networks, over-the-air television broadcast networks, and/or any communication system in which audio and visual content may be aggregated and selected for transmission to the end user.

FIG. 1 illustrates example components and communication links in a communication network 100 suitable for implementing the various embodiments. Receiver devices 102 (e.g., smart-phones, laptops, set-top-boxes, televisions, etc.) may receive multimedia content via communication links (wired or wireless) to one or more network servers and systems 126, which may provide a connection to the Internet 108 and/or content servers 130. The wired communication links may be achieved via cable, fiber, or any medium suitable for communicating IP data or audio-visual content. Wireless communication links may be via short-range radio technologies (e.g., Bluetooth®, WiFi, etc.), via peer-to-peer connections, or via any other known wireless communication technology.

Receiver devices 102 may also receive multimedia content via a unicast network 106, such as a cellular network, WiFi network, WiMAX, etc. A typical unicast network 106 includes a plurality of unicast transmitters 118 coupled to a controller 120 and/or network operations center (NOC), which operate to coordinate the delivery of content to receiver devices 102. To facilitate IP and streaming data services (e.g., streaming audio-video feeds), the unicast network 106 may include one or more network servers and systems 124 that provide a connection to the Internet 108. Receiver devices 102 may communicate with the unicast network 106 via two-way wireless communication links 122 (e.g., to receive multimedia content streams from the Internet 108 and/or the content servers 130, etc.).

Figure 2:
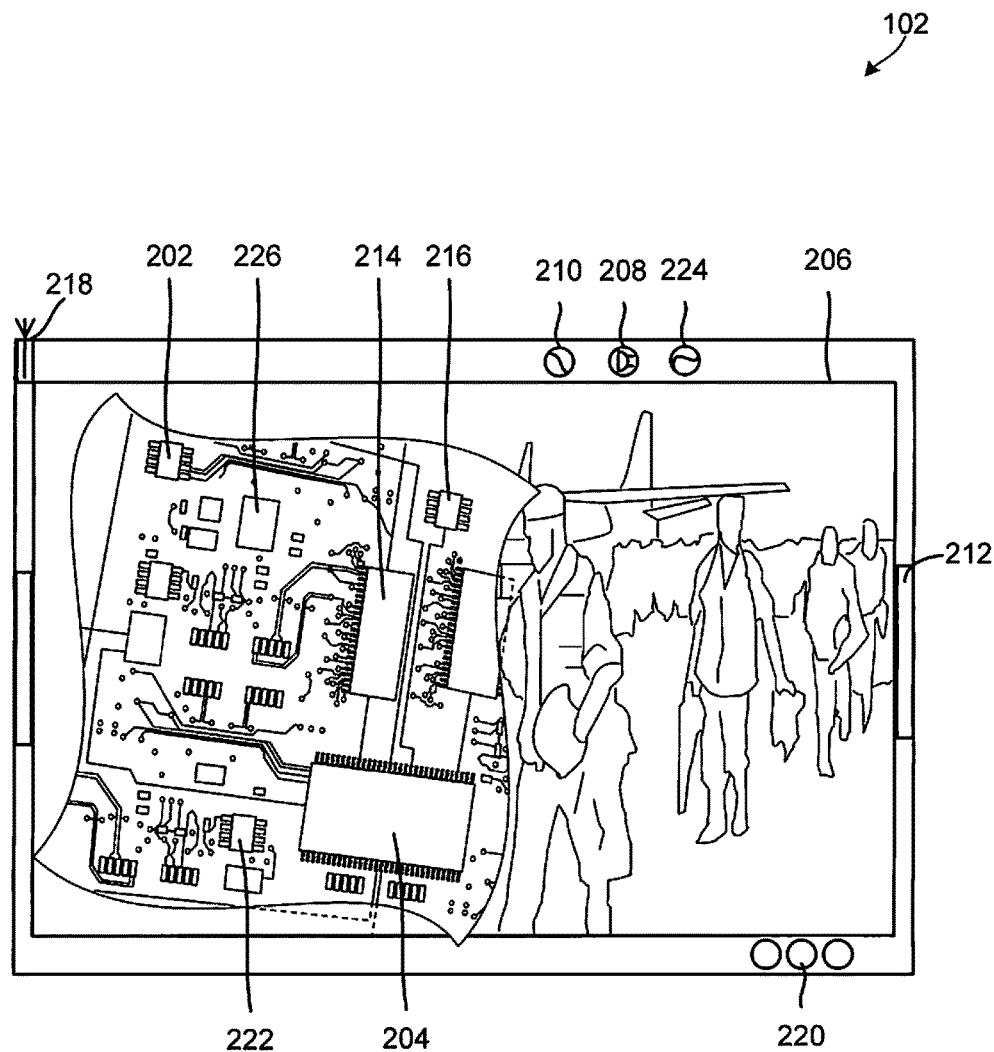
FIG. 2 is a block diagram illustrating sample components of a receiver device that may be configured to detect user behavior in accordance with various embodiments.

FIG. 2 illustrates sample components of a receiver device 102 that may be configured to detect user behavior and elect to receive a subset of a multimedia stream in accordance with various embodiments. Specifically, FIG. 2 illustrates that the receiver device 102 may include a processor 202 coupled to internal memory 204, an electronic display 206, a microphone 208, a camera 210, sensors 226, and/or to a speaker 212. The receiver device 102 may further include user interface 220 elements (e.g., buttons, icons, etc.) for receiving user inputs, which may be hard key buttons, soft key buttons, touch keys, or any input means suitable for receiving a user input.

The sensors 226 may include one or more sensors configured to detect motion, gestures (e.g., hand movements), eye movements, and/or other user actions, which when recognized by the receiver device 102, may cause the receiver device 102 to execute a specific command or operation. The sensors 226 may also include one or more sensors for scanning/collecting information from the user's environment (e.g., room, etc.), geo-spatial positioning sensors (e.g., GPS transceiver, etc.), distance measuring sensors (e.g., a laser, sonic range finder, etc.), orientation sensors (e.g., up, down, level, etc.), etc. The sensors 226 may further include an eye tracking component configured to detect eye movements or the presence or the location of the user's eye (e.g., via the camera 210) relative to the receiver device 102 or electronic display 206.

The receiver device 102 may include communications circuitry 214 coupled to the processor 202 for establishing data connections with a network, such as a local area network coupled to servers or computers of a service provider network. Additionally, the receiver device 102 may include a transceiver 216, a wireless radio 222 (e.g., Bluetooth® radio, WiFi radio, etc.), and/or an antenna 218 for sending and receiving electromagnetic radiation and/or connecting to a wireless data link.

The processor 202 and memory 204 may be configured to receive audio-video content from a network server (e.g., a content server, an application server, etc.) and process and present the received audio-video content on the electronic display 206 and speaker 212. The receiver device 102 may communicate with the network server via a direct communication link (e.g., wireless data link, etc.), through a central server, via short-range radio technologies (e.g., Bluetooth®, WiFi, etc.), via peer-to-peer connections, or via any other known communication technologies.

In an embodiment, the receiver device 102 may be configured to detect user behavior, determine an operating mode for the receiver device 102 based on the detected user behavior, set a current operating mode of the receiver device 102 to the determined operating mode, and adjust the receiver device's 102 usage of resources based on the operating mode. For example, the receiver device 102 may be configured to detect when a user is not actively viewing the video content being rendered on the electronic display 206, determine that the operating mode should be set to "audio only," and set the operating mode to "audio only," and power-off the electronic display 206. Similarly, the receiver device 102 may determine that a detected user behavior is indicative of the user's intention to view video content, determine that the operating mode should be set to "full mode," set the operating mode to "full," turn on the electronic display 206, and render video content on the electronic display 206. As a further example, the receiver device 102 may be configured to determine that a detected user behavior is indicative of the user's absence from the vicinity of the receiver device 102, determine that the operating mode should be set to "power-off," and de-energize or disconnect the electronic display 206, speaker 212, processor 202, etc. from a power source.

As discussed above, the receiver device 102 may be configured to detect user behaviors. In various embodiments, detecting user behaviors may include determining that the user is not viewing or paying attention to the electronic display 206 (e.g., via information collected from a camera, motion sensor, etc.), determining that the user is not in close proximity to the receiver device 102, and/or determining that the user is engaged in an activity (e.g., driving, entering text in a different browser tab, etc.) that indicates there is a relatively high probability that the user is not actively viewing and/or listening to content.

In an embodiment, detecting user behaviors may include the receiver device 102 receiving user input, such as an input indicating that the user only desires to consume the audio portions of an audio-video file, is currently driving, etc. In an embodiment, detecting user behaviors may include accessing information stored in memory, such as configuration files, settings, preferences, etc.

In an embodiment, detecting user behaviors may include gathering information from software applications (e.g., calendar application, browser, etc.), geo-spatial positioning and navigation systems (e.g., global positioning system or "GPS"), and/or other sensors of the receiver device 102 (e.g., microphone 208, camera 210, motion sensor, speaker 212, etc.).

In an embodiment, detecting user behaviors may include analyzing user actions and/or interactions with the receiver device 102, such as determining whether the user is typing, texting, making a voice call, moving, opening a new browser tab, minimizing the browser tab/page displaying the audio-video feed, scrolling past the video player in a webpage, viewing an electronic program guide, etc.

As discussed above, the receiver device 102 may be configured to determine an operating mode based on the detected user behavior and adjust its usage of resources based on the operating mode. In various embodiments, the operating modes may include a full mode, an audio-only mode, a video-only mode, a local mode, a closed-caption mode, a sleep mode, a low-power mode, and/or a power-off mode. By way of example, the receiver device 102 may be configured to present both audio and video content when in full mode, present only audio content when in audio-only mode, and present only video content when in video-only mode. Adjusting the usage of resources may include powering on or off the receiver device 102 or any combination of the receiver device's components. For example, adjusting the usage of resources may include powering on both a display and a speaker when in full mode, powering off a display when in audio-only mode, powering off a speaker when in video-only mode, and powering off both a display and a speaker when in any of the sleep, low power or power-off modes.

In various embodiments, the operating modes may further include time-delayed versions of the audio-only, video-only, local, closed-caption, sleep, low power, and/or power-off modes. For example, the receiver device 102 may be configured to present both audio and video content for a predetermined amount of time after determining that the display is to be powered off (i.e., before entering the audio-only mode) when in the time-delayed audio-only mode. Likewise, the receiver device 102 may perform similar or corresponding operations for each of the time-delayed versions of the video-only, local, sleep, low power, and power-off modes.

In an embodiment, the receiver device 102 may be configured to terminate audio and/or video feeds (e.g., turn off wireless radios, etc.) and switch to presenting audio and/or video content stored on memory when entering the local mode.

In an embodiment, the receiver device 102 may be configured to power off the electronic display 206, and activate a text-to-speech software module to convert closed caption information into audio when in the closed-captioned mode.

In an embodiment, the receiver device 102 may be configured to determine an operating mode for the receiver device 102 based on the availability of network or receiver device resources (e.g., bandwidth, available system memory, processor utilization, remaining battery power, etc.).

Figure 3:
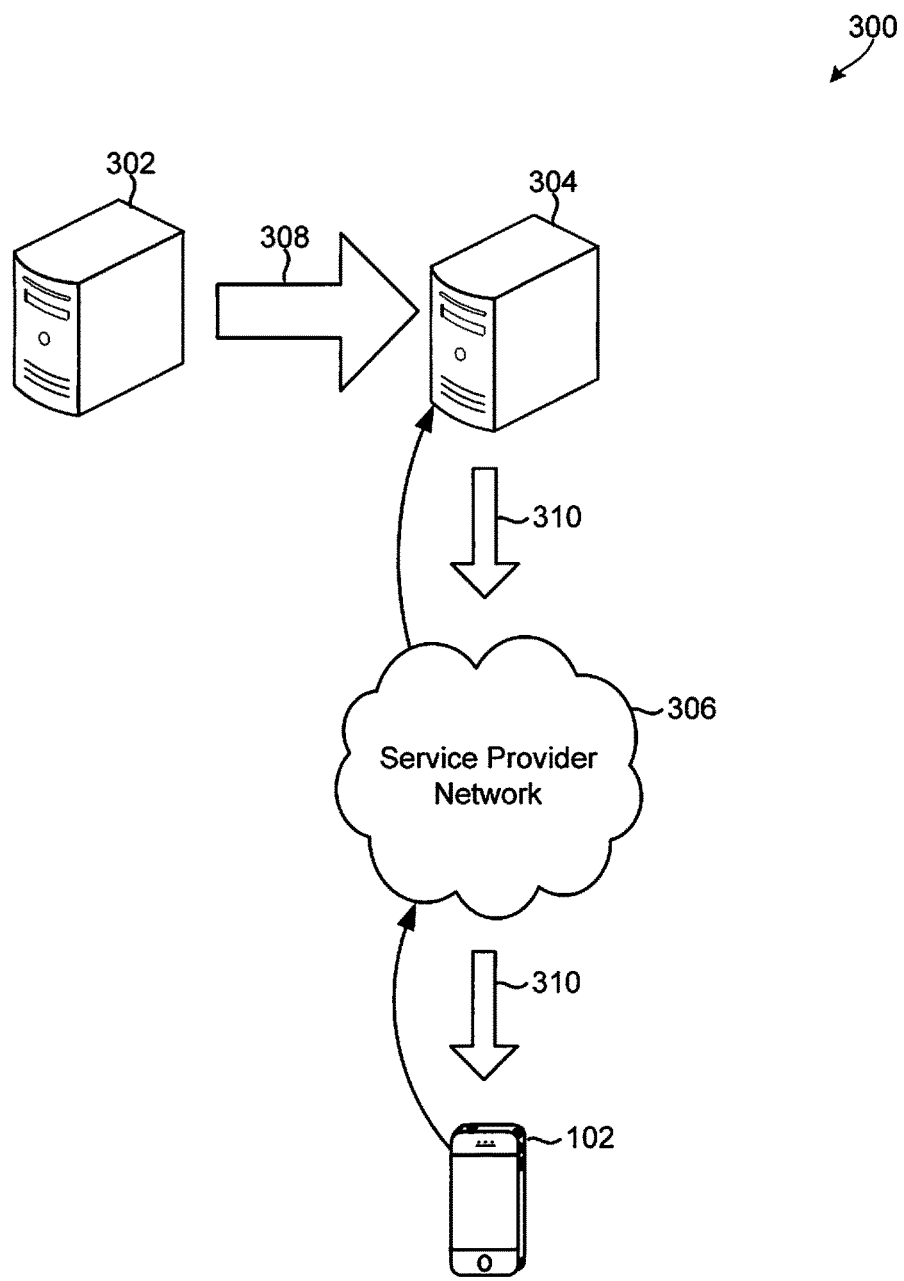
FIG. 3 is a block diagram illustrating example network components and information flows in an embodiment communication system.

FIG. 3 illustrates example components and information flows in a communication system 300 suitable for implementing various embodiments. The communication system 300 may include a content provider server 302, a network server 304, and a receiver device 102. The content provider server 302 may send an audio-video file/stream 308 to the network server 304 for relaying to the receiver device 102 via the service provider network 306.

In various embodiments, the network server 304 may be included in (or as part of) a service provider network 306, in a local area network (LAN), in a wide area network (WAN), the Internet, etc. The network server 304 may be coupled to a service provider network 306 (e.g., via the Internet, etc.) and/or the receiver device 102 (e.g., via a LAN, etc.). In an embodiment, the network server 304 may be a proxy server.

As discussed above, the receiver device 102 may be configured to detect user behaviors and determine an operating mode based on the detected user behaviors. In an embodiment, the receiver device 102 may be further configured to notify the network server 304 of the detected user behaviors and/or operating mode. For example, the receiver device 102 may notify the network server 304 each time the receiver device 102 changes its current operating mode to a new or different operating mode.

The network server 304 may be configured to receive the operating mode notification from the receiver device 102, and terminate or suspend sending the audio-video file/stream 310 based on the operating mode (e.g., local mode, power-off mode, etc.). The network server 304 may also be configured to modify, alter, or transform the audio-video file/stream 308 based on the operating mode of the receiver device 102, and send the modified/altered/transformed audio-video file/stream 310 to the receiver device 102 (i.e., in lieu of the original audio-video file/stream 308 received from the content provider server 302). For example, the network server 304 may receive a notification from the receiver device 102 indicating that the operating mode should be set to "audio only," transform an audio-video file to an audio file, and send the audio file to the receiver device 102 in lieu of the audio-video file. Since the audio file will contain significantly less information than the audio-video file, sending the audio file in lieu of the audio-video file will reduce the amount of information communicated over the service provider network 306.

In an embodiment, generating the modified audio-video file/stream 310 may include generating an enhanced audio stream by upsampling, denoising, or otherwise enhancing (e.g., converting standard definition audio to a high definition audio, etc.) the audio content. For example, the network server 304 may separate the audio content from the video content, discard the video content, enhance the audio content, and send the enhanced audio stream to the receiver device 102 as the modified audio-video file/stream 310. In this manner, the various embodiments may enhance the user experience while lowering network resources consumption.

In an embodiment, the receiver device 102 may be configured to generate and store a timestamp when it enters a new operating mode and/or detects a relevant user behavior. The timestamp may be communicated to the network server 304 to indicate a time (or position, frame, etc.) after which the user stopped consuming audio and/or video content or a time (or position, frame, etc.) after which the receiver device 102 stopped presenting audio and/or video content to the user (e.g., via the electronic display/speakers). The network server 304 may store audio-video content based on the received timestamp(s) for later transmission to the receiver device 102 (e.g., when the user returns to consuming the audio and/or video content). In this manner, a user may automatically return to consuming audio and/or video content from where he/she left off. Moreover, the user may choose to return to either the position/frame where the receiver device 102 determined that the user stopped consuming the audio/video or the position/frame in which the receiver device 102 stopped presenting the audio/video.

In an embodiment, the receiver device 102 and/or network server 304 may be configured to monitor the amount of network resources (e.g., bandwidth, etc.) saved by terminating, delaying, altering and/or modifying audio-video streams 310 over a given time period (e.g., billing period). In this manner, the receiver device 102 and/or network server 304 may track how much money the user saved in each billing period as a result of the reductions in network resource consumption. Similarly, the various embodiments may monitor reductions in network traffic and resource usage resulting from terminating, delaying, altering and/or modifying audio-video streams 310.

As discussed above, the network server 304 may be configured to alter the audio-video stream 310 based on the operating mode, and send the altered audio-video file/stream 310 to the receiver device 102. In an embodiment, altering the audio-video stream 310 may include selecting a stream (e.g., audio-only stream, etc.) from a plurality of available streams (e.g., audio-video stream, video-only stream, audio-only stream, etc.). In other embodiments, altering the audio-video stream 310 may include converting a file from a first format (e.g., MPEG, etc.) into a second format (MP3, etc.), de-multiplexing a multiplexed audio-video stream, and/or selecting or altering a transmission or session setup protocol (e.g., via session initiation protocol, MPEG transport stream, etc.).

Figure 4:
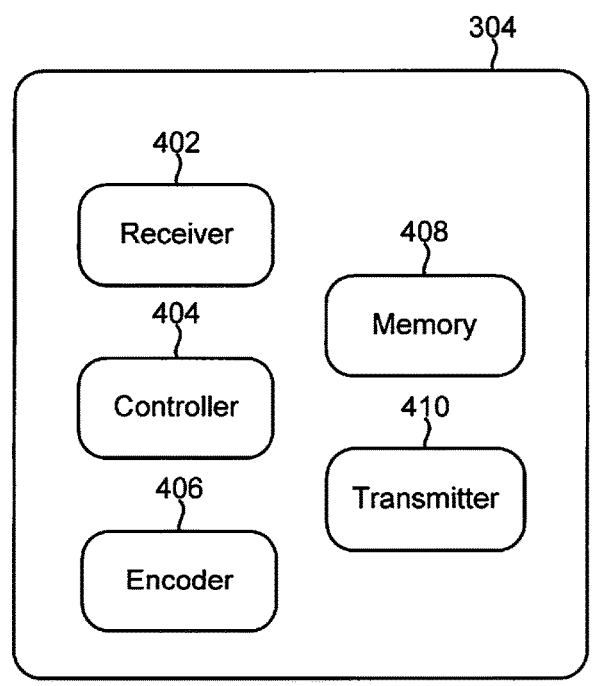
FIG. 4 is a block diagram illustrating example functional components of a network server configured to alter a multimedia stream in accordance with an embodiment.

FIG. 4 illustrates example functional components of an exemplary network server 304 configured to alter a multimedia or audio-video stream in accordance with an embodiment. In the example illustrated in FIG. 4, the network server 304 includes a receiver module 402, a controller module 404, an encoder module 406, a memory 408, and a transmitter module 412.

The receiver module 402 may be configured to receive communication signals containing a multiplex of information (including audio and/or video streams, multimedia and/or data packets, frames, etc.), and process the received communication signals (e.g., demodulate, perform multiprotocol-encapsulation forward error correction, etc.) to extract the multiplexed information.

The encoder module 406 may be configured to decode/process the multiplexed information to generate multiple, independent streams, files, or data units (e.g., based on a manifest file, etc.). For example, the encoder module 404 may decode/process an audio-video stream to generate audio data and video data, encode the audio data in a first stream, and encode the video data into a second stream.

The controller module 404 may be configured to determine which of the plurality of generated streams are to be sent to the receiver device based on the operating mode and/or select one or more streams for transmission to the receiver device (i.e., via the transmission module 410).

In various embodiments, the encoder 406 may also be configured to encode the audio and/or video data at multiple bit rates and/or into a plurality of streams. In these embodiments, the controller 404 may generate a manifest file that includes information pertaining the available streams (e.g., differing bit rates, communication channels etc.), which may be sent to the receiver device in advance.

Figure 5:
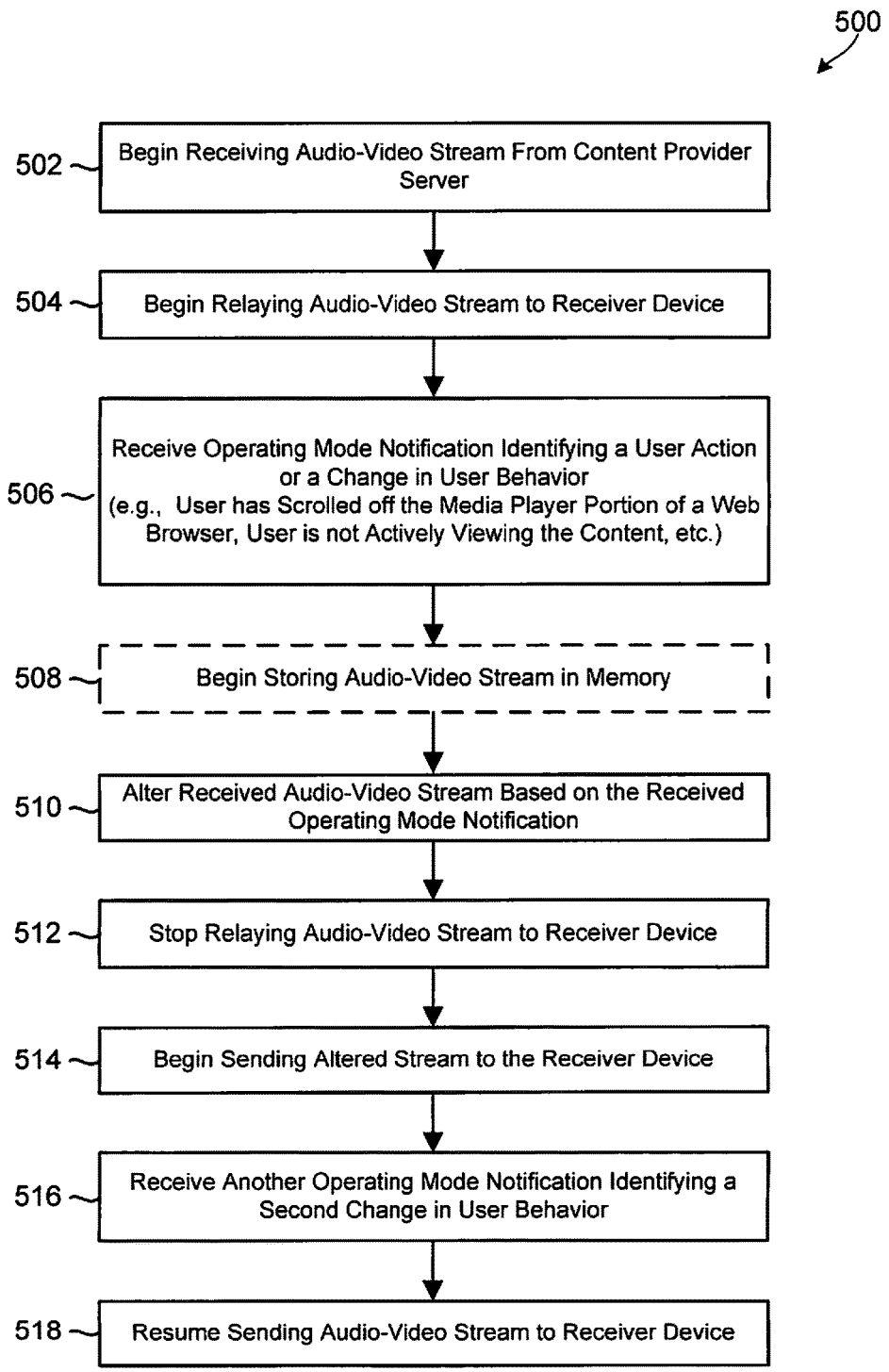
FIG. 5 is a process flow diagram illustrating an embodiment network server method of streaming multimedia content to a receiver device based on detected user behavior.

FIG. 5 illustrates an embodiment network server method 500 of streaming multimedia content to a receiver device based on detected user behavior. In block 502, a network server may begin receiving an audio-video stream from a content provider server. In block 504, the network server may begin relaying the received audio-video stream to a receiver device (e.g., over a service provider network). In block 506, the network server may receive an operating mode notification identifying a user action, a change in user behavior, and/or an operating mode of the receiver device (e.g., full mode, an audio-only mode, a video-only mode, etc.). For example, the network server may receive an operating mode notification indicating that the user has scrolled off the media player portion of a web browser, has had his/her eyes closed for an extended period of time or is otherwise not actively viewing the content, the receiver device is entering the audio-only mode, etc.

In block 508, the network server may begin storing the audio-video stream from the content provider server in a memory. In block 510, the network server may alter the audio-video stream from the content provider server based on the received notification. For example, the network server may convert the audio-video stream into an audio-only stream. In block 512, the network server may stop relaying the audio-video stream to the receiver device. In block 514, the network server may begin sending the altered stream (e.g., audio-video stream) to the receiver device. In block 516, the network server may receive another operating mode notification from the receiver device. For example, the network server may receive an operating mode notification indicating that the receiver device is entering the full mode. In block 518, the network server may resume sending the audio-video stream to the receiver device.

In an embodiment, in block 518, the network server may send the stored audio-video stream to the receiver device. In this embodiment, the network server may continue to receive and store the audio-video stream from the content provider server while retrieving and sending the stored audio-video stream to the receiver device.

Figure 6:
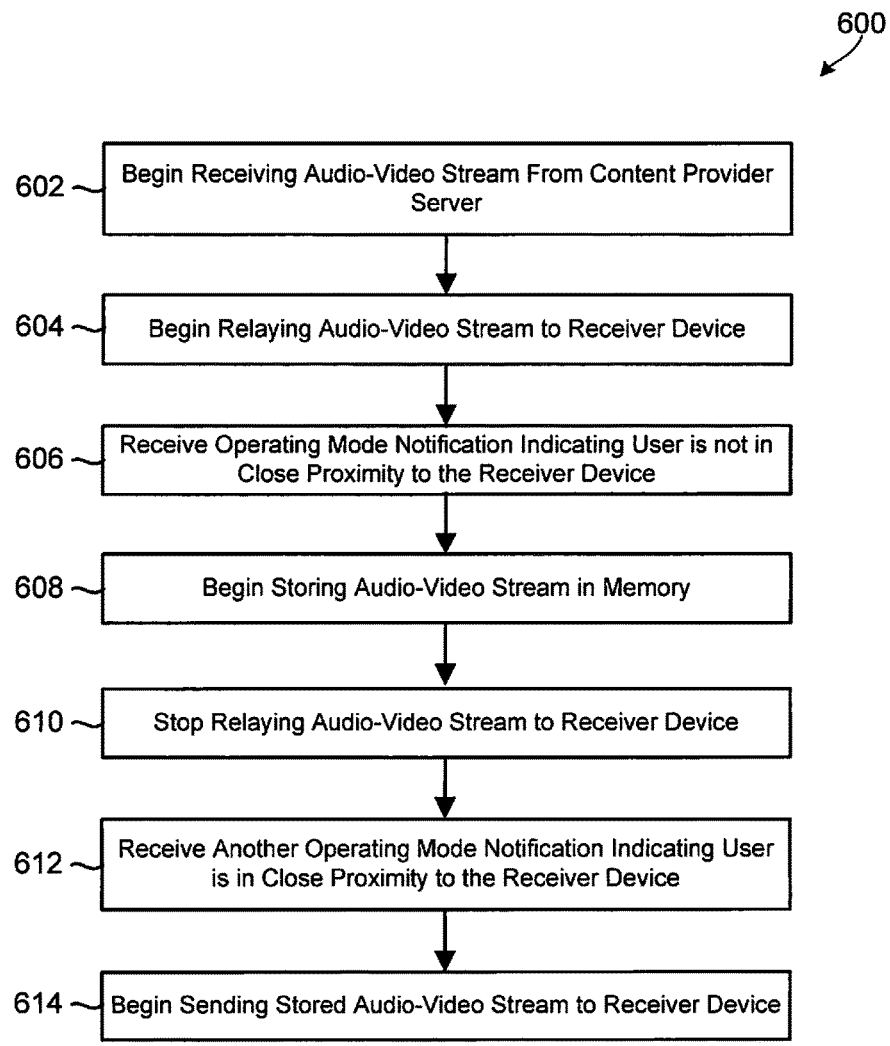
FIG. 6 is a process flow diagram illustrating an embodiment network server method of streaming multimedia content to a receiver device based on detected user behavior.

FIG. 6 illustrates another embodiment network server method 600 of streaming multimedia content to a receiver device based on detected user behavior/actions. In block 602, a network server may begin receiving an audio-video stream from a content provider server. In block 604, the network server may begin relaying the received audio-video stream to a receiver device. In block 606, the network server may receive an operating mode notification indicating that the user of the receiver device is no longer in close proximity to the receiver device. In block 608, the network server may begin storing the audio-video stream from the content provider server in memory. In block 610, the network server may stop relaying the audio-video stream to the receiver device. In block 612, the network server may receive an operating mode notification from the receiver device indicating that the user is now in close proximity to the receiver device. In block 614, the network server may send the stored audio-video stream to the receiver device.

Figure 7:
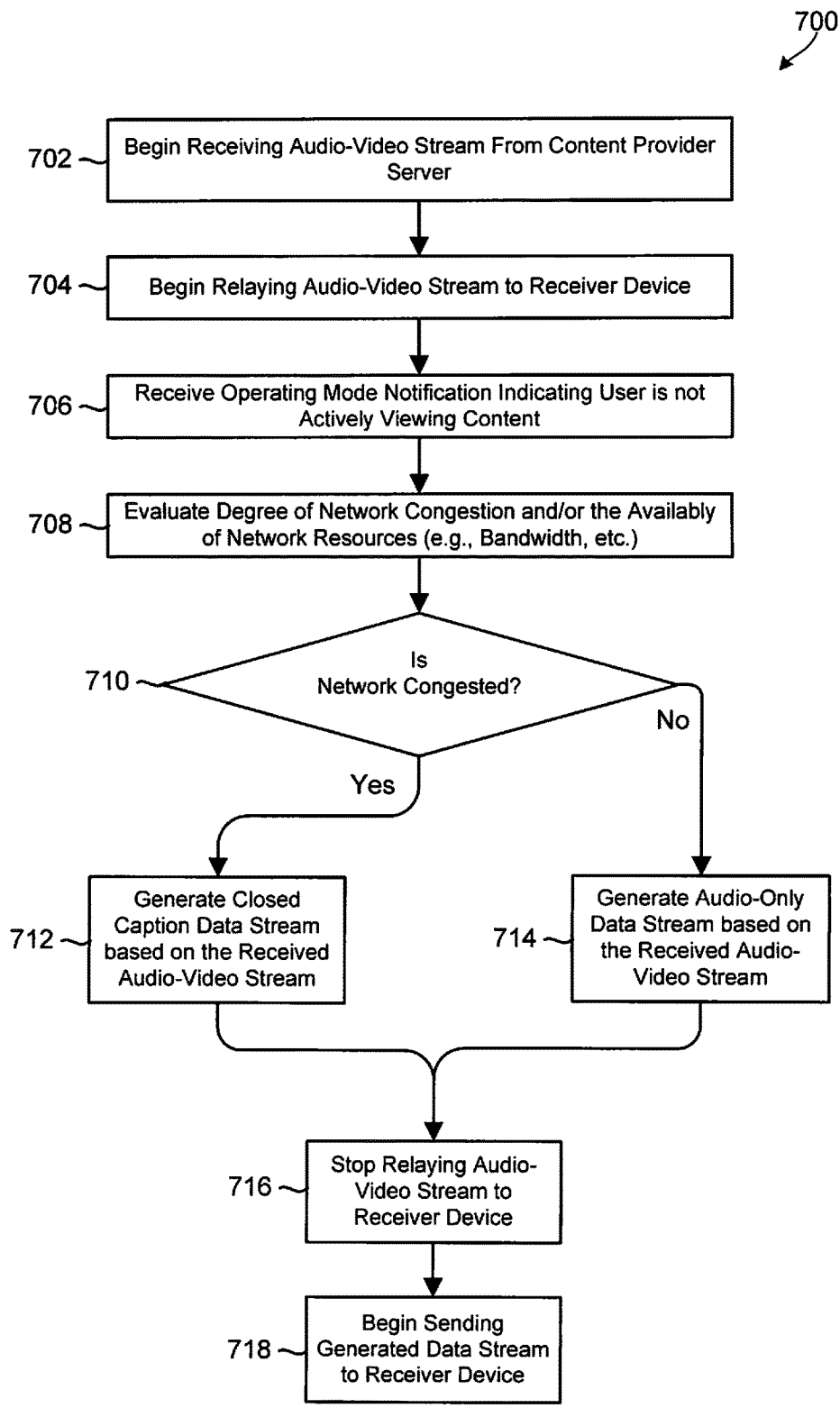
FIG. 7 is a process flow diagram illustrating an embodiment network server method of streaming multimedia content to a receiver device based on the availability of network resources and detected user behavior.

FIG. 7 illustrates an embodiment network server method 700 of streaming multimedia content to a receiver device based on detected user behavior/actions and the availability of network resources. In block 702, a network server may begin receiving an audio-video stream from a content provider server. In block 704, the network server may begin relaying the received audio-video stream to a receiver device. In block 706, the network server may receive an operating mode notification indicating that the user is not actively viewing the content. In block 708, the network server may evaluate, analyze or determine the degree/level of network congestion and/or the availability of network resources.

In determination block 710, the network server may determine whether the network is congested. When the network server determines that the network is congested (i.e., determination block 710="Yes"), in block 712, the network server may generate a closed caption data stream based on the audio-video stream received from a content provider server. When the network server determines that the network is not congested (i.e., determination block 710="No"), in block 714, the network server may generate an audio-only stream based on the audio-video stream received from a content provider server. In block 716, the network server may stop relaying the audio-video stream to the receiver device. In block 718, the network server may send the generated audio-video stream to the receiver device.

Figure 8:
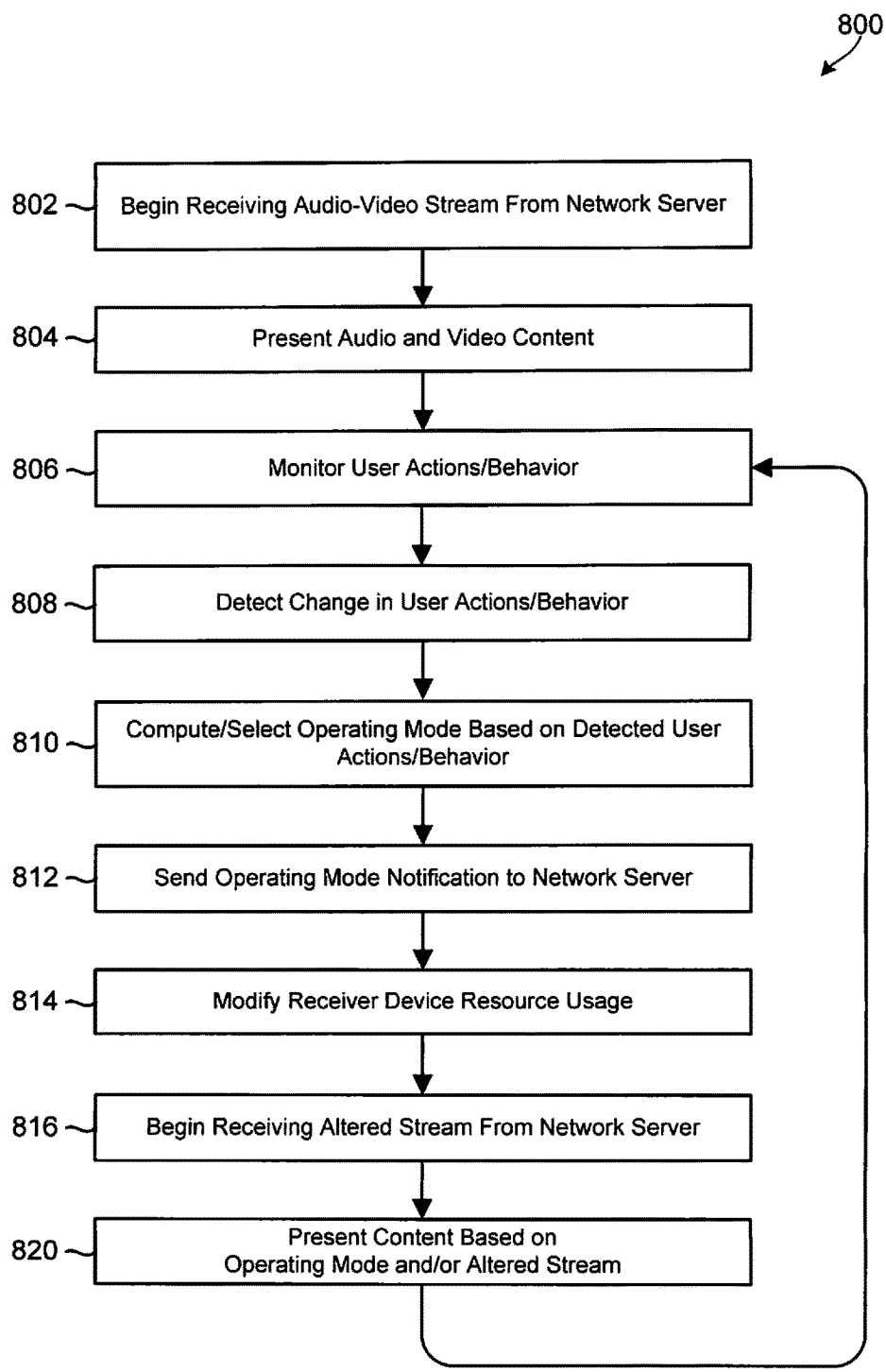
FIG. 8 is a process flow diagram illustrating an embodiment receiver device method of receiving multimedia content based on detected user behavior.

FIG. 8 illustrates an embodiment receiver device method 800 of reducing the consumption of network and device resources based on detected user behavior. In block 802, a receiver device may begin receiving an audio-video stream from a network server. In block 804, the receiver device may present audio and video content to the user (e.g., via an electronic display, speakers, etc.). In block 806, the receiver device may monitor the user actions and/or behaviors. For example, the receiver device may determine whether the display is powered on, whether the user has scrolled off the media player portion of a browser, periodically activate a camera to determine if the user's eyes are visibly open, activate an eye tracking component to determine if the user's eye movements are consistent with active viewing of the presented content, activate motion sensors to determine if the user is in close proximity to the receiver device, activate orientation sensors to determine if the receiver device is face down, etc.

In block 808, the receiver device may detect a change in user behavior/action (e.g., user is no longer actively viewing the content, etc.). In block 810, the receiver device may compute, determine, or select an operating mode based on the detected user behavior/action and/or the availability of resources. For example, the receiver device may select an "audio-only" mode based on determining that the user is no longer actively viewing the content.

In block 812, the receiver device may generate a operating mode notification message and send the operating mode notification to the network server. In block 814, the receiver device may modify the usage of resources on the receiver device (e.g., powering off a display, de-energizing a video processor, etc.).

In block 816, the receiver device may begin receiving an altered stream (e.g., an audio-only stream, etc.) from the network server. In block 820, the receiver device may present content based on the selected/current operating mode and or the content included in the altered stream. For example, the receiver device may present only audio content (e.g., via the speakers) based on entering an audio-only mode and/or based on receiving an audio-only stream. The operations of block 806-820 may be repeated until the stream is terminated, the receiver device is powered off, the user elects to interrupt the operations, etc.

Figure 9:
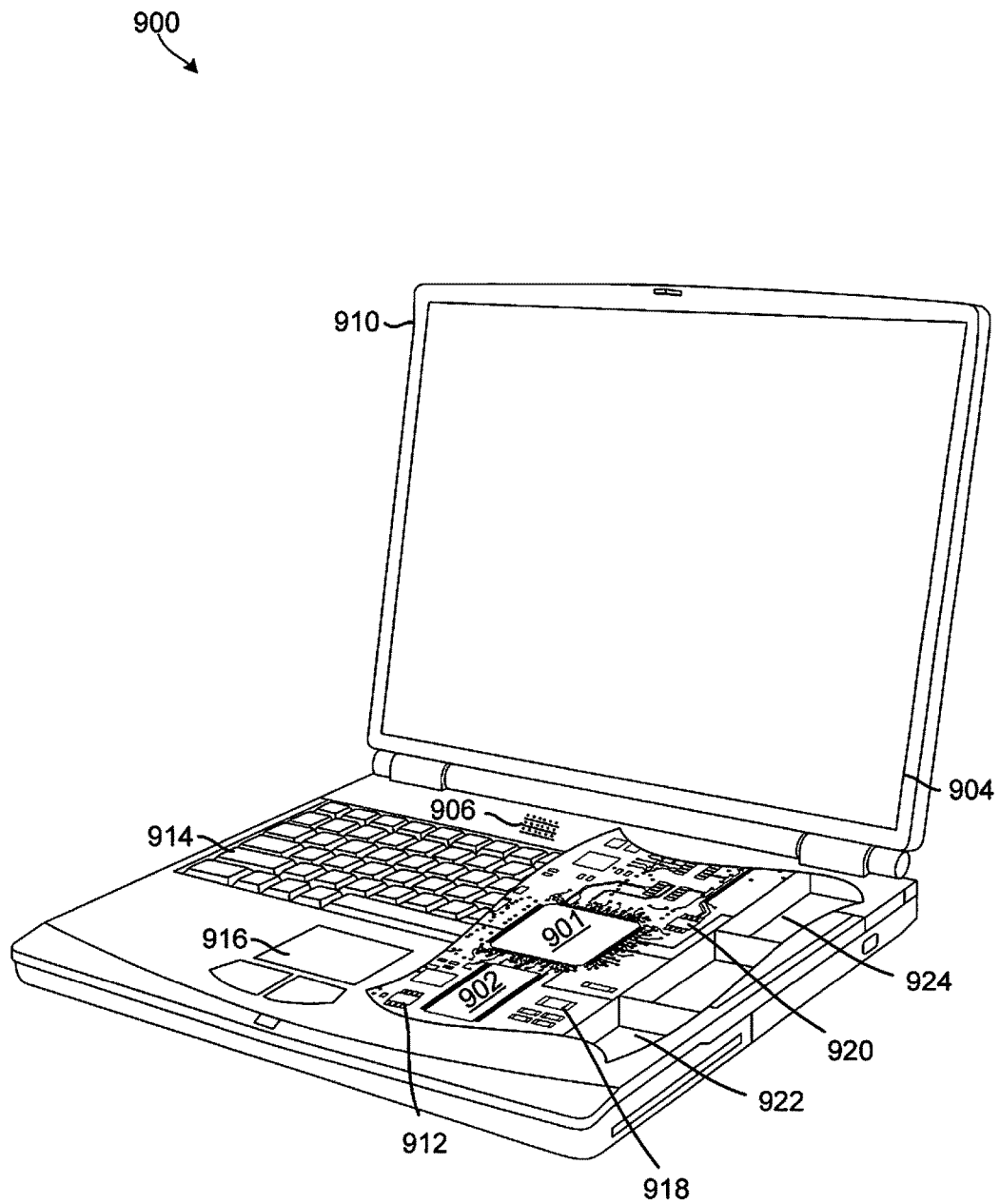
FIG. 9 is a system block diagram of a receiver device suitable for use with any of the embodiments.

FIG. 9 is a system block diagram of a mobile receiver device in the form of a laptop computer suitable for use with any of the embodiments. A typical laptop computer 900 may include a processor 901 coupled to an electronic display 904, a speaker 906, a volatile memory 902 and to a nonvolatile memory, such as a disk drive 922. The laptop computer 900 may also include a floppy disc drive, compact disc (CD) or DVD disc drive coupled to the processor 901. The laptop computer 900 may include an antenna 910, a multimedia receiver 912, a transceiver 918 and/or communications circuitry 920 coupled to the processor 901 for sending and receiving electromagnetic radiation, connecting to a wireless data link, and receiving IP and streaming multimedia services (e.g., audio-video streams, information flows, etc.). Additionally, the laptop computer 900 may include network access ports 924 coupled to the processor 901 for establishing data connections with a network (e.g., LAN coupled to a service provider network, etc.). A laptop computer 900 typically also includes a keyboard 914 and a mouse pad 916 for receiving user inputs.

Figure 10:
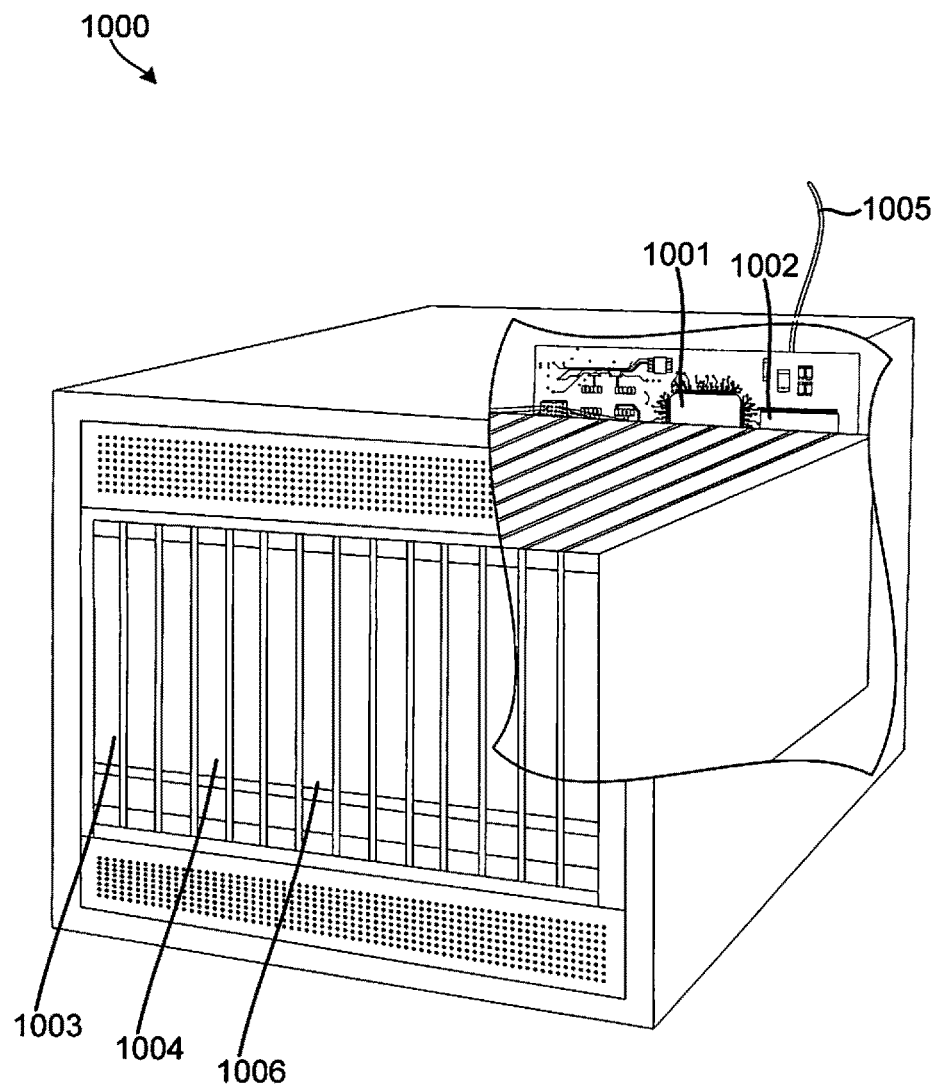
FIG. 10 is a system block of a server suitable for use with any of the embodiments.

The various network components, severs, and systems may be implemented on any of a variety of commercially available server devices, such as the server 1000 illustrated in FIG. 10. Such a server 1000 typically includes a processor 1001 coupled to volatile memory 1002 and a large capacity nonvolatile memory, such as a disk drive 1003. The server 1000 may also include a floppy disc drive, compact disc (CD) or DVD disc drive 1004 coupled to the processor 1001. The server 1000 may also include network access ports 1006 coupled to the processor 1001 for establishing data connections with a network 1005, such as a local area network coupled to other computers, servers, or components in a service provider network.

The processors 901, 1001 may be any programmable microprocessor, microcomputer or multiple processor chip or chips that can be configured by software instructions (applications) to perform a variety of functions, including the functions of the various embodiments described above. In some mobile receiver devices, multiple processors may be provided, such as one processor dedicated to wireless communication functions, one processor dedicated to video processing, and one processor dedicated to running other applications. Typically, software applications may be stored in the internal memory 902, 1002 before they are accessed and loaded into the processor 901, 1001. The processor 901, 1001 may include internal memory sufficient to store the application software instructions.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as hardware, software, or any combination thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

Embodiments implemented in computer software may be implemented in software, firmware, middleware, microcode, hardware description languages, or any combination thereof. A code segment or machine-executable instructions may represent a procedure, a function, a subprogram, a program, a process, a task, a tread, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. Non-transitory computer-readable or processor-readable media includes both computer storage media and tangible storage media that facilitate transfer of a computer program from one place to another. Non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a signal processing circuit that may be suitable for use in a wireless receiver or mobile device. Such a wireless signal processing circuit may include circuits for accomplishing the signal measuring and calculating steps described in the various embodiments.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of communicating multimedia content over a service provider network, the method comprising:
    receiving, in a network server processor, an audio-video stream from a content provider server, wherein a resource load is associated with the audio-video stream;

relaying the audio-video stream to a receiver device via the service provider network;

receiving, in the network server processor, an operating mode notification from the receiver device, the received operating mode notification identifying a receiver device operating mode of presenting at least a portion of the audio-video stream based on a user behavior that is automatically detected by the receiver device;

extracting, in the network server processor, one of an audio content portion of the audio-video stream or a video content portion of the audio-video stream based on the received operating mode notification;

enhancing to a higher definition, in the network server processor, one of the audio content portion or the video content portion that is not extracted, such that a resource load associated with the non-extracted enhanced audio content portion or video content portion is lower than the resource load associated with the received audio-video stream; and sending the enhanced audio-video stream without the extracted audio content portion or video content portion to the receiver device via the service provider network.

2. The method of claim 1, wherein extracting one of an audio content portion of the audio-video stream and a video content portion of the audio-video stream based on the received operating mode notification comprises transforming the audio-video stream into an audio-only stream or a video-only stream, respectively.

3. The method of claim 1, wherein extracting one of an audio content portion of the audio-video stream and a video content portion of the audio-video stream based on the received operating mode notification comprises generating an audio stream based on the audio-video stream.

4. A method of communicating multimedia content over a service provider network, the method comprising:

receiving, in a receiver device, an audio-video stream from a network server, wherein a resource load is associated with the audio-video stream;

detecting a user behavior in a device processor of the receiver device;

selecting an operating mode of presenting at least a portion of the audio-video stream in the device processor based on the detected user behavior;

generating an operating mode notification in the device processor based on the selected operating mode;

sending the generated operating mode notification to the network server processor via the service provider network; and receiving an audio-video stream from which one of an audio content portion of the audio-video stream or a video content portion of the audio-video stream has been extracted from the network server in response to sending the generated operating mode notification;

enhancing to a higher definition, in the receiver device, one of the audio content portion or the video content portion that is not extracted, such that a resource load associated with the non-extracted enhanced audio content portion or video content portion is lower than the resource load associated with the received audio-video stream.

5. The method of claim 4, wherein detecting the user behavior comprises detecting that a user is not actively viewing content rendered on an electronic display of the receiver device.

6. The method of claim 5, wherein detecting that the user is not actively viewing content rendered on the electronic display of the receiver device comprises activating a camera of the receiver device.

7. The method of claim 5, wherein detecting that the user is not actively viewing content rendered on the electronic display of the receiver device comprises determining whether the user has scrolled off a video player portion of a web browser.

8. A communication system, comprising:

a receiver device comprising a receiver configured to receive data via a service provider network, a memory, and a device processor coupled to the receiver and the memory; and a server comprising communication circuitry configured to transmit data via the service provider network, and a server processor coupled to the communication circuitry, wherein the server processor is configured with server-executable instructions to perform operations comprising:

receiving an audio-video stream from a content provider server, wherein a resource load is associated with the audio-video stream;

relaying the audio-video stream to the receiver device via the service provider network;

receiving an operating mode notification from the receiver device, the received operating mode notification identifying a receiver device operating mode of presenting at least a portion of the audio-video stream based on a user behavior that is automatically detected by the receiver device;

extracting one of an audio content portion of the audio-video stream or a video content portion of the audio-video stream based on the received operating mode notification;

enhancing to a higher definition one of the audio content portion or the video content portion that is not extracted, such that a resource load associated with the non-extracted enhanced audio content portion or video content portion is lower than the resource load associated with the received audio-video stream; and sending the enhanced audio-video stream without the extracted audio content portion or video content portion to the receiver device via the service provider network, and wherein the device processor is configured with processor-executable instructions to perform operations comprising:

detecting the user behavior;

selecting an operating mode based on the detected user behavior;

generating the operating mode notification based on the selected operating mode; and sending the generated operating mode notification to the server processor via the service provider network.

9. The communication system of claim 8, wherein the server processor is configured with server-executable instructions to perform operations such that extracting one of an audio content portion of the audio-video stream and a video content portion of the audio-video stream based on the received operating mode notification comprises transforming the audio-video stream into an audio-only stream or a video-only stream, respectively.

10. The communication system of claim 8, wherein the server processor is configured with server-executable instructions such that extracting one of an audio content portion of the audio-video stream and a video content portion of the audio-video stream based on the received operating mode notification comprises generating an audio stream based on the audio-video stream.

11. The communication system of claim 8, wherein the device processor is configured with processor-executable instructions such that detecting the user behavior comprises detecting that a user is not actively viewing content rendered on an electronic display of the receiver device.

12. The communication system of claim 11, wherein the device processor is configured with processor-executable instructions such that detecting that the user is not actively viewing content rendered on the electronic display of the receiver device comprises activating a camera of the receiver device.

13. The communication system of claim 11, wherein the device processor is configured with processor-executable instructions such that detecting that the user is not actively viewing content rendered on the electronic display of the receiver device comprises determining whether the user has scrolled off a video player portion of a web browser.

14. A server, comprising:
a server processor configured with server-executable instructions to perform operations comprising:
receiving an audio-video stream from a content provider server, wherein a resource load is associated with the audio-video stream;
relaying the audio-video stream to a receiver device via a service provider network;
receiving an operating mode notification from the receiver device, the received operating mode notification identifying a receiver device operating mode of presenting at least a portion of the audio-video stream based on a user behavior that is automatically detected by the receiver device;
extracting, in the network server processor, one of an audio content portion of the audio-video stream or a video content portion of the audio-video stream based on the received operating mode notification;
enhancing to a higher definition, in the network server processor, one of the audio content portion or the video content portion that is not extracted, such that a resource load associated with the non-extracted enhanced audio content portion or video content portion is lower than the resource load associated with the received audio-video stream; and
sending the enhanced audio-video stream without the extracted audio content portion or video content portion to the receiver device via the service provider network.

15. The server of claim 14, wherein the server processor is configured with server-executable instructions to perform operations such that extracting one of an audio content portion of the audio-video stream and a video content portion of the audio-video stream based on the received operating mode notification comprises transforming the audio-video stream into an audio-only stream or a video-only stream, respectively.

16. The server of claim 14, wherein the server processor is configured with server-executable instructions such that extracting one of an audio content portion of the audio-video stream and a video content portion of the audio-video stream based on the received operating mode notification comprises generating an audio stream based on the audio-video stream.

17. The server of claim 14, wherein the server processor is configured with server-executable instructions such that receiving the operating mode notification from the receiver device comprises receiving a notification that includes information indicating that a user is not actively viewing content rendered on an electronic display of the receiver device.

18. The server of claim 17, wherein the server processor is configured with server-executable instructions such that receiving the notification that includes information indicating that the user is not actively viewing content rendered on the electronic display of the receiver device comprises receiving information collected in the receiver device in response to the receiver device activating a camera.

19. The server of claim 17, wherein the server processor is configured with server-executable instructions such that receiving the notification that includes information indicating that the user is not actively viewing content rendered on the electronic display of the receiver device comprises receiving information collected on the receiver device in response to the receiver device determining that the user has scrolled off a video player portion of a web browser.

20. A non-transitory computer readable storage medium having stored thereon processor-executable software instructions configured to cause a server processor to perform operations for communicating multimedia content over a service provider network, the operations comprising:
receiving an audio-video stream from a content provider server, wherein at resource load is associated with the audio-video stream;
relaying the audio-video stream to a receiver device via the service provider network; receiving an operating mode notification from the receiver device, the received operating mode notification identifying a receiver device operating mode of presenting at least, a portion of the audio-video stream based on a user behavior that is automatically detected by the receiver device;
extracting, in the network server processor, one of an audio content portion of the audio-video stream or a video content portion of the audio-video stream based on the received operating mode notification:
enhancing to a higher definition, in the network server processor, one of the, audio content portion or the video content portion that is not extracted, such that a resource load associated with the non-extracted enhanced audio content portion or video content portion is lower than the resource load associated with the received audio-video stream; and
sending the enhanced audio-video stream without the extracted audio content portion or video content portion to the receiver device via the service provider network.

21. The non-transitory computer readable storage medium of claim 20, wherein the stored processor-executable software instructions are configured to cause a processor to perform operations such that extracting one of an audio content portion of the audio-video stream and a video content portion of the audio-video stream based on the received operating mode notification comprises transforming the audio-video stream into an audio-only stream or a video-only stream, respectively.

22. The non-transitory computer readable storage medium of claim 20, wherein the stored processor-executable software instructions are configured to cause a processor to perform operations such that extracting one of an audio content portion of the audio-video stream and a video content portion of the audio-video stream based on the received operating mode notification comprises generating an audio stream based on the audio-video stream.

23. The non-transitory computer readable storage medium of claim 20, wherein the stored processor-executable software instructions are configured to cause a processor to perform operations such that receiving the operating mode notification from the receiver device comprises receiving a notification that includes information indicating that a user is not actively viewing content rendered on an electronic display of the receiver device.

24. The non-transitory computer readable storage medium of claim 23, wherein the stored processor-executable software instructions are configured to cause a processor to perform operations such that receiving the notification that includes information indicating that the user is not actively viewing content rendered on the electronic display of the receiver device comprises receiving information collected in the receiver device in response to the receiver device activating a camera.

25. The non-transitory computer readable storage medium of claim 23, wherein the stored processor-executable software instructions are configured to cause a processor to perform operations such that receiving the notification that includes information indicating that the user is not actively viewing content rendered on the electronic display of the receiver device comprises receiving information collected on the receiver device in response to the receiver device determining that the user has scrolled off a video player portion of a web browser.

\* \* \* \* \*